United States Patent
Tada et al.

(10) Patent No.: US 10,494,585 B2
(45) Date of Patent: Dec. 3, 2019

(54) REFRIGERATOR OIL AND WORKING FLUID COMPOSITION FOR REFRIGERATORS

(71) Applicant: JXTG Nippon Oil & Energy Corporation, Chiyoda-ku, Tokyo (JP)

(72) Inventors: Akira Tada, Tokyo (JP); Ken Sawada, Tokyo (JP)

(73) Assignee: JXTG Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 15/554,341

(22) PCT Filed: Feb. 12, 2016

(86) PCT No.: PCT/JP2016/054161
§ 371 (c)(1),
(2) Date: Aug. 29, 2017

(87) PCT Pub. No.: WO2016/140040
PCT Pub. Date: Sep. 9, 2016

(65) Prior Publication Data
US 2018/0044607 A1   Feb. 15, 2018

(30) Foreign Application Priority Data

Mar. 2, 2015  (JP) .................... 2015-040383

(51) Int. Cl.
| | | |
|---|---|---|
| *C10M 169/04* | (2006.01) | |
| *C09K 5/04* | (2006.01) | |
| *C10M 105/38* | (2006.01) | |
| *C10M 129/16* | (2006.01) | |
| *C10M 171/00* | (2006.01) | |

(52) U.S. Cl.
CPC ............. *C10M 169/04* (2013.01); *C09K 5/04* (2013.01); *C09K 5/045* (2013.01); *C10M 105/38* (2013.01); *C10M 129/16* (2013.01); *C10M 171/008* (2013.01); *C09K 2205/11* (2013.01); *C09K 2205/126* (2013.01); *C10M 2207/2835* (2013.01); *C10N 2220/302* (2013.01); *C10N 2230/06* (2013.01); *C10N 2240/30* (2013.01)

(58) Field of Classification Search
CPC ............ C10M 169/04; C10M 171/008; C10M 129/16; C10M 105/38; C10M 2207/2835; C09K 5/045; C09K 5/04; C09K 2205/11; C09K 2205/126; C10N 2220/302; C10N 2240/30; C10N 2230/06
USPC .................... 252/68; 508/579, 577
See application file for complete search history.

(56) References Cited

U.S. PATENT DOCUMENTS

| | | | | |
|---|---|---|---|---|
| 5,744,053 | A * | 4/1998 | Kaimai | C10M 129/16 252/68 |
| 9,944,881 | B2 * | 4/2018 | Saito | C10M 169/04 |
| 2001/0011716 | A1 * | 8/2001 | Kaneko | C10M 129/16 252/68 |
| 2015/0001438 | A1 * | 1/2015 | Kishi | C09K 5/041 252/68 |
| 2015/0028252 | A1 * | 1/2015 | Saito | C09K 5/045 252/68 |
| 2015/0038381 | A1 * | 2/2015 | Matsumoto | C10M 171/007 508/261 |
| 2017/0335232 | A1 * | 11/2017 | Kaneko | C08F 116/14 |

FOREIGN PATENT DOCUMENTS

| | | |
|---|---|---|
| CN | 1134974 A | 11/1996 |
| CN | 1205357 A | 1/1999 |
| CN | 1836030 A | 9/2006 |
| CN | 1930276 A | 3/2007 |
| CN | 101535457 A | 9/2009 |
| CN | 103589486 A | 2/2014 |
| CN | 104254515 A | 12/2014 |
| JP | H9-157676 A | 6/1997 |
| JP | H10-265790 A | 10/1998 |
| JP | H11-315295 A | 11/1999 |
| JP | 2008-115300 A | 5/2008 |
| JP | 2012-072273 A | 4/2012 |
| JP | 2013-170255 A | 9/2013 |
| TW | 201343902 A | 11/2013 |
| WO | WO 2013/115296 A1 | 8/2013 |

OTHER PUBLICATIONS

International Bureau of the WIPO, International Preliminary Report on Patentability issued in International Application No. PCT/JP2016/054161 (dated Sep. 14, 2017).
Japan Patent Office, International Search Report issued in International Application No. PCT/JP2016/054161 (dated Mar. 8, 2016).
Taiwanese Intellectual Property Office, Office Action issued in Taiwanese Application No. 105105007 (dated May 9, 2017).
State Intellectual Property Office of the People's Republic of China, Office Action issued in Chinese Application No. 201680012271.6 (dated Aug. 29, 2019) 11 pp.

* cited by examiner

*Primary Examiner* — Douglas J McGinty
(74) *Attorney, Agent, or Firm* — Leydig, Voit & Mayer, Ltd.

(57) ABSTRACT

The present invention provides a refrigerating machine oil comprising: an ester of a polyhydric alcohol and a fatty acid as a base oil; and an ether compound of a polyhydric alcohol, the refrigerating machine oil being used with an unsaturated hydrofluorocarbon refrigerant.

5 Claims, No Drawings

REFRIGERATOR OIL AND WORKING FLUID COMPOSITION FOR REFRIGERATORS

CROSS-REFERENCE TO RELATED APPLICATIONS

This patent application is the U.S. national phase of International Application No. PCT/JP2016/054161, filed on Feb. 12, 2016, which claims the benefit of Japanese Patent Application No. 2015-040383, filed Mar. 2, 2015, the disclosures of which are incorporated herein by reference in their entireties for all purposes.

TECHNICAL FIELD

The present invention relates to a refrigerating machine oil and a working fluid composition for a refrigerating machine.

BACKGROUND ART

Refrigerating machines such as refrigerators, car air-conditioners, room air-conditioners, and automatic vending machines have a compressor for circulating a refrigerant in a refrigeration cycle. The compressor is charged with a refrigerating machine oil for lubricating a sliding part. Thus, the refrigerating machine oil coexists with the refrigerant in the refrigerating machine and, therefore, the refrigerating machine oil is required to have properties such as: lubricity, and thermal and chemical stability, in the presence of the refrigerant; and compatibility with the refrigerant.

For example, Patent Literature 1 discloses a lubricating oil composition for a compression refrigerating machine that exhibits superior thermal and chemical stability even when used in a compression refrigerating machine employing a predetermined saturated hydrofluorocarbon refrigerant, the lubricating oil composition containing a base oil and a predetermined organic compound having a double bond in the molecule.

Meanwhile, the use of unsaturated hydrofluorocarbon refrigerants having very low ozone depletion potential and global warming potential has recently been proposed in view of environmental effects. However, the aforementioned various properties required of a refrigerating machine oil may show unpredictable behaviors depending on the kind of the coexisting refrigerant; thus, a refrigerating machine oil that shows superior properties for use with a saturated hydrofluorocarbon refrigerant, such as the refrigerating machine oil as described in Patent Literature 1, does not necessarily show superior properties for use with an unsaturated hydrofluorocarbon refrigerant.

CITATION LIST

Patent Literature

Patent Literature 1: Japanese Unexamined Patent Publication No. 2012/72273

SUMMARY OF INVENTION

Technical Problem

An object of the present invention is to provide a refrigerating machine oil and a working fluid composition for a refrigerating machine which are superior in lubricity (especially antiwear property) in the presence of an unsaturated hydrofluorocarbon refrigerant.

Solution to Problem

The present invention provides a refrigerating machine oil comprising: an ester of a polyhydric alcohol and a fatty acid as a base oil; and an ether compound of a polyhydric alcohol, the refrigerating machine oil being used with an unsaturated hydrofluorocarbon refrigerant.

The ether compound is preferably a compound represented by the following formula (1):

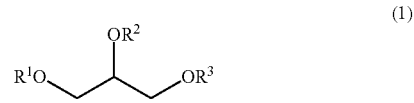

wherein $R^1$, $R^2$, and $R^3$ each independently represent a hydrogen atom, a C1 to C22 alkyl group, a C1 to C22 alkenyl group, or a C1 to C22 aryl group, and wherein at least one of $R^1$, $R^2$, and $R^3$ represents the group other than a hydrogen atom.

The content of the ether compound of polyhydric alcohol is preferably 0.4% by mass or less based on a total amount of the refrigerating machine oil.

The present invention also provides a working fluid composition for a refrigerating machine comprising the above refrigerating machine oil and an unsaturated hydrofluorocarbon refrigerant.

The unsaturated hydrofluorocarbon is preferably at least one selected from 1,3,3,3-tetrafluoropropene and 2,3,3,3-tetrafluoropropene.

Advantageous Effects of Invention

According to the present invention, a refrigerating machine oil and a working fluid composition for a refrigerating machine which are superior in lubricity (especially antiwear property) in the presence of an unsaturated hydrofluorocarbon refrigerant can be provided.

DESCRIPTION OF EMBODIMENTS

Embodiments of the present invention will be described below in detail.

The refrigerating machine oil contains: an ester of a polyhydric alcohol and a fatty acid as a base oil; and an ether compound of a polyhydric alcohol.

The polyhydric alcohol constituting the ester of the polyhydric alcohol and the fatty acid (which may hereinafter be referred to as "polyolester") is preferably a polyhydric alcohol having 2 to 6 hydroxy groups. The number of carbon atoms of the polyhydric alcohol is preferably 4 or more and more preferably 5 or more and is preferably 12 or less and more preferably 10 or less. As the polyhydric alcohol, a hindered alcohol such as neopentylglycol, trimethylolethane, trimethylolpropane, trimethylolbutane, di-(trimethylolpropane), tri-(trimethylolpropane), pentaerythritol, or dipentaerythritol is preferably used. In order to achieve especially superior compatibility with a refrigerant and hydrolysis stability, it is more preferable to use pentaerythritol or to use pentaerythritol and dipentaerythritol in combination.

The fatty acid constituting the polyolester is preferably a saturated fatty acid. The number of carbon atoms of the fatty acid is preferably from 4 to 20. Examples of C4 to C20 fatty acids include butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, and icosanoic acid. These C4 to C20 fatty acids may be linear or branched, and are preferably branched.

The ratio of C4 to C20 fatty acids in fatty acids constituting the polyolester is preferably from 20 to 100% by mole, more preferably from 50 to 100% by mole, further preferably from 70 to 100% by mole, and especially preferably from 90 to 100% by mole. It is more preferable that the ratio of C4 to C18 fatty acids be within the above range, it is further preferable that the ratio of C4 to C9 fatty acids be within the above range, and it is especially preferable that the ratio of C5 to C9 fatty acids be within the above range.

The ratio of C4 to C20 branched fatty acids in the fatty acids constituting the polyolester is preferably from 20 to 100% by mole, more preferably from 50 to 100% by mole, further preferably from 70 to 100% by mole, and especially preferably from 90 to 100% by mole. It is more preferable that the ratio of C4 to C18 branched fatty acids be within the above range, it is further preferable that the ratio of C4 to C9 branched fatty acids be within the above range, and it is especially preferable that the ratio of C5 to C9 branched fatty acids be within the above range.

The C4 to C20 branched fatty acid is preferably a fatty acid branched at $\alpha$ position and/or $\beta$ position, and is more preferably 2-methylpropanoic acid, 2-methylbutanoic acid, 2-methylpentanoic acid, 2-methylhexanoic acid, 2-ethylpentanoic acid, 2-methyiheptanoic acid, 2-ethylhexanoic acid, 3,5,5-trimethylhexanoic acid, or 2-ethylhexadecanoic acid, and is further preferably 2-ethylhexanoic acid or 3,5,5-trimethylhexanoic acid.

The fatty acids may include a fatty acid other than the C4 to C20 fatty acids. Examples of the fatty acid other than the C4 to C20 fatty acids include heneicosanoic acid, docosanoic acid, tricosanoic acid, and tetracosanoic acid. These fatty acids may be linear or branched.

A polyolester may be a partial ester, in which a part of hydroxy groups of a polyhydric alcohol is not esterified and remains as a hydroxy group; may be a complete ester, in which all of hydroxy groups are esterified; or may be a mixture of a partial ester and a complete ester. The hydroxyl value of a polyolester is preferably 10 mg KOH/g or less, more preferably 5 mg KOH/g or less, and further preferably 3 mg KOH/g or less. The hydroxyl value as used herein means a hydroxyl value measured according to HS K0070: 1992.

The content of the polyolester may be preferably 50% by mass or more, more preferably 70% by mass or more, further preferably 80% by mass or more, and especially preferably 90% by mass or more, based on the total amount of the refrigerating machine oil. The content of the polyolester may be 99% by mass or less based on the total amount of the refrigerating machine oil.

The base oil may contain another base oil in addition to the polyolester. Examples of the other base oil include: hydrocarbon oils such as mineral oils, olefin polymers, naphthalene compounds, and alkylbenzenes; ester base oils other than the above polyolester; and oxygen-containing synthetic oils such as polyglycols, polyvinyl ethers, ketones, polyphenyl ethers, silicones, polysiloxanes, and perfluoroethers. Preferred oxygen-containing synthetic oils are polyglycols, polyvinyl ethers, and ketones. The content of the other base oil may be 50% by mass or less based on the total amount of the base oils.

The kinematic viscosity of the base oil at 40° C. is preferably 3 mm$^2$/s or more, more preferably 4 mm$^2$/s or more, further preferably 5 mm$^2$/s or more, and especially preferably 10 mm$^2$/s from the viewpoint of further improvement in lubricity (especially antiwear property), and is preferably 1000 mm$^2$/s or less, more preferably 500 mm$^2$/s or less, further preferably 400 mm$^2$/s or less, and especially preferably 300 mm$^2$/s or less from the viewpoint of improvement in oil return performance. The kinematic viscosity of the base oil at 100° C. is preferably 1 mm$^2$/s or more, more preferably 2 mm$^2$/s or more, and further preferably 4 mm$^2$/s or more from the viewpoint of further improvement in lubricity (especially antiwear property), and is preferably 100 mm$^2$/s or less, more preferably 50 mm$^2$/s or less, and further preferably 30 mm$^2$/s or less from the viewpoint of improvement in oil return performance. The kinematic viscosity as used herein means a kinematic viscosity measured according to JIS K2283: 2000.

The ether compound of polyhydric alcohol is, for example, an ether compound of a polyhydric alcohol having 3 to 6 hydroxy groups. Examples of the polyhydric alcohol include glycerin, trimethylolpropane, erythritol, pentaerythritol, arabitol, sorbitol, and mannitol.

Specific examples of the ether compound of polyhydric alcohol include compounds represented by any of the following formulas (1) to (6).

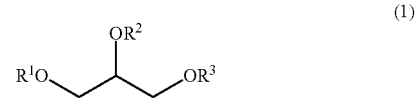

(1)

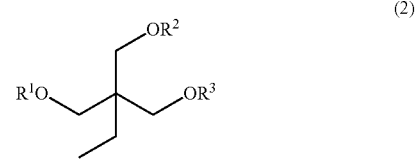

(2)

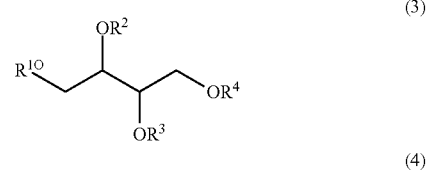

(3)

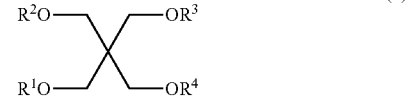

(4)

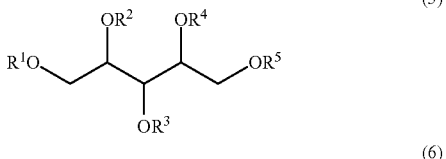

(5)

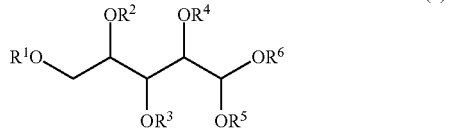

(6)

In the formulas, $R^1$ to $R^6$ each independently represent a hydrogen atom, a C1 to C22 alkyl group, an alkenyl group, an aryl group, or a glycol ether residue represented by —(R$^a$O)$_m$—R$^b$, provided that at least one R in each formula represents the group other than a hydrogen atom. R$^a$ represents a C2 to C6 alkylene group and R$^b$ represents a C1 to C20 alkyl group, a C1 to C20 alkenyl group, or a C1 to C20 aryl group. The alkyl group and alkenyl group may be linear or branched. m represents an integer of 1 or more and may be, for example, an integer of 1 to 20, an integer of 1 to 10, or an integer of 1 to 3.

The ether compound of polyhydric alcohol is preferably a partial ether compound represented by any of the formulas (1) to (6) wherein at least one R is a hydrogen atom, and is more preferably a monoether compound represented by any of the formulas (1) to (6) wherein one R is other than a hydrogen atom and the other R are all hydrogen atoms.

The ether compound of polyhydric alcohol is preferably a compound represented by the formula (1) from the viewpoint of further improvement in lubricity.

When the ether compound of polyhydric alcohol is a compound represented by the formula (1) (glyceryl ether), $R^1$, $R^2$, and $R^3$ are preferably each independently a hydrogen atom, a C1 to C22 alkyl group, a C1 to C22 alkenyl group, or a C1 to C22 aryl group and are more preferably each independently a hydrogen atom, a C1 to C22 alkyl group, or a C1 to C22 alkenyl group, provided that at least one of $R^1$, $R^2$, and $R^3$ is the group other than a hydrogen atom. In this case, the number of carbon atoms of the alkyl, alkenyl, and aryl groups may be preferably from 4 to 20 and more preferably from 8 to 18. The compound represented by the formula (1) (glyceryl ether) is further preferably a glyceryl monoether in which two of $R^1$, $R^2$, and $R^3$ are hydrogen atoms and the other of $R^2$, and $R^3$ is the group other than a hydrogen atom.

The ether compound of polyhydric alcohol may be a compound represented by the following formula (7):

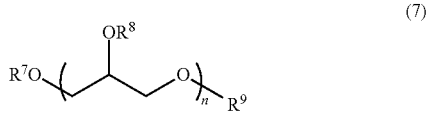

(7)

wherein $R^7$, $R^8$, and $R^9$ each independently represent a hydrogen atom or a hydrocarbon group, and n represents an integer of 1 or more, provided that at least one of $R^7$, $R^8$, and $R^9$ represents a hydrocarbon group.

Examples of the hydrocarbons represented by $R^7$, $R^8$, and $R^9$ include a C1 to C30 alkyl group, a C3 to C30 alkenyl group, a C6 to C30 aryl group, and a C7 to C30 aralkyl group. The alkyl group and alkenyl group may be linear, branched, or cyclic. n is preferably an integer of 1 to 10 and more preferably an integer of 1 to 3.

Examples of the compound represented by the formula (7) include glycerin monododecyl ether, glycerin monotetradecyl ether, glycerin monohexadecyl ether (chimyl alcohol), glycerin monooctadecyl ether (batyl alcohol), glycerin monooleyl ether (selachyl alcohol), diglycerin monododecyl ether, diglycerin monotetradecyl ether, diglycerin monohexadecyl ether, diglycerin monooctadecyl ether, diglycerin monooleyl ether, triglycerin monododecyl ether, triglycerin monotetradecyl ether, triglycerin monohexadecyl ether, triglycerin monooctadecyl ether, and triglycerin monooleyl ether. Among these, glycerin monooctadecyl ether, glycerin monooleyl ether, diglycerin monooleyl ether, and triglycerin monooleyl ether are used preferably.

The content of the ether compound of polyhydric alcohol is preferably 0.05% by mass or more, more preferably 0.07% by mass or more, and further preferably 0.1% by mass or more based on the total amount of the refrigerating machine oil, from the viewpoint of further improvement in lubricity (especially antiwear property), and is preferably 0.4% by mass or less, more preferably 0.35% by mass or less, and further preferably 0.3% by mass or less from the viewpoint of improvement in stability, especially prevention of deposition. The content of the ether compound of polyhydric alcohol is preferably from 0.05 to 0.4% by mass, from 0.05 to 0.35% by mass, from 0.05 to 0.3% by mass, from 0.07 to 0.4% by mass, from 0.07 to 0.35% by mass, from 0.07 to 0.3% by mass, from 0.1 to 0.4% by mass, from 0.1 to 0.35% by mass, or from 0.1 to 0.3% by mass, from the viewpoints of further improvement in lubricity (especially antiwear property) and improvement in stability (especially prevention of deposition).

The refrigerating machine oil may further contain another additive in addition to the ether compound of polyhydric alcohol. Examples of other additives include an acid scavenger, an antioxidant, an extreme-pressure agent, an oiliness agent, an antifoaming agent, a metal deactivator, an antiwear agent, a viscosity index improver, a pour-point depressant, a detergent dispersant, a friction modifier, and an anti-corrosive agent. The content of the other additive may be preferably 5% by mass or less and more preferably 2% by mass or less based on the total amount of the refrigerating machine oil.

From the viewpoint of further improvement in thermal and chemical stability, the refrigerating machine oil preferably further contains an acid scavenger among the additives listed above. Examples of the acid scavenger include an epoxy compound.

Examples of the epoxy compound include a glycidyl ether type epoxy compound, a glycidyl ester type epoxy compound, an aryloxirane compound, an alkyloxirane compound, an alicyclic epoxy compound, an epoxidized fatty acid monoester, and an epoxidized vegetable oil. These epoxy compounds are used singly or in combinations of two or more.

The glycidyl ether type epoxy compound is, for example, an aryl glycidyl ether type epoxy compound or alkyl glycidyl ether type epoxy compound represented by the following formula (8):

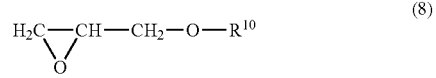

(8)

wherein $R^{10}$ represents an aryl group or a C5 to C18 alkyl group.

Preferred as the glycidyl ether type epoxy compound represented by the formula (8) are n-butylphenyl glycidyl ether, i-butylphenyl glycidyl ether, sec-butylphenyl glycidyl ether, tert-butylphenyl glycidyl ether, pentylphenyl glycidyl ether, hexylphenyl glycidyl ether, heptylphenyl glycidyl ether, octylphenyl glycidyl ether, nonylphenyl glycidyl ether, decylphenyl glycidyl ether, decyl glycidyl ether, undecyl glycidyl ether, dodecyl glycidyl ether, tridecyl glycidyl ether, tetradecyl glycidyl ether, and 2-ethylhexyl glycidyl ether.

The glycidyl ether type epoxy compound may be, for example, neopentyl glycol diglycidyl ether, trimethylolpropane triglycidyl ether, pentaerythritol tetraglycidyl ether, 1,6-hexanediol diglycidyl ether, sorbitol polyglycidyl ether, polyalkylene glycol monoglycidyl ether, and polyalkylene glycol diglycidyl ether, rather than the epoxy compound represented by the formula (8).

The glycidyl ester type epoxy compound is, for example, a compound represented by the following formula (9):

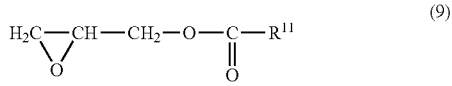

wherein $R^{11}$ represents an aryl group, a C5 to C18 alkyl group, or an alkenyl group.

Examples of a glycidyl ester type epoxy compound represented by the formula (9) preferably include glycidyl benzoate, glycidyl neodecanoate, glycidyl-2,2-dimethyl octanoate, glycidyl acrylate, and glycidyl methacrylate.

An alicyclic epoxy compound is a compound having a partial structure represented by the following formula (10):

wherein carbon atoms constituting an epoxy group are direct constituents of an alicyclic ring.

Examples of an alicyclic epoxy compound include 1,2-epoxycyclohexane, 1,2-epoxycyclopentane, 3',4'-epoxycyclohexylmethyl-3,4-epoxycyclohexane carboxylate, bis(3,4-epoxycyclohexylmethyl)adipate, exo-2,3-epoxynorbornane, bis(3,4-epoxy-6-methylcyclohexylmethyl)adipate, 2-(7-oxabicyclo[4.1.0]hept-3-yl)-spiro(1,3-dioxane-5,3'-[7]oxabicyclo[4.1.0]heptane), 4-(1'-methylepoxyethyl)-1,2-epoxy-2-methylcyclohexane, and 4-epoxyethyl-1,2-epoxycyclohexane.

Examples of the aryloxirane compound include styrene oxide and alkylstyrene oxide.

Examples of an alkyloxirane compound include 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,2-epoxyoctadecane, 1,2-epoxynonadecane, and 1,2-epoxyicosane.

Examples of an epoxidized fatty acid monoester include an ester of an epoxidized C12 to C20 fatty acid with a C1 to C8 alcohol, or phenol or alkyl phenol. As an epoxidized fatty acid monoester, butyl-, hexyl-, benzyl-, cyclohexyl-, methoxyethyl-, octyl-, phenyl- and butylphenyl-esters of epoxystearic acid may be used preferably.

Examples of an epoxidized vegetable oil include an epoxy compound of a vegetable oil, such as a soybean oil, a linseed oil, and a cottonseed oil.

The content of the epoxy compound may be preferably 0.1% by mass or more, more preferably 0.15% by mass or more, and further preferably 0.2% by mass or more based on the total amount of the refrigerating machine oil, and may be preferably 1.5% by mass or less, more preferably 1.0% by mass or less, and further preferably 0.5% by mass or less based on the total amount of the refrigerating machine oil.

The refrigerating machine oil preferably further contains an antioxidant among the additives listed above. Examples of the antioxidant include phenol compounds such as di-tert-butyl-p-cresol and amine compounds such as an alkyl diphenyl amine. The content of the antioxidant may be, for example, 0.02% by mass or more and 0.5% by mass or less based on the total amount of the refrigerating machine oil.

The volume resistivity of the refrigerating machine oil is preferably $1.0 \times 10^{12}$ Ω·cm or more, more preferably $1.0 \times 10^{13}$ Ω·cm or more, and further preferably $1.0 \times 10^{14}$ Ω·cm or more. Especially, when a refrigerating machine oil is used in a closed refrigerating machine, a high electrical insulation tends to be required. The volume resistivity as used herein means a volume resistivity measured at 25° C. according to JIS C2101: 1999.

The moisture content of a refrigerating machine oil is preferably 200 ppm or less based on the total amount of a refrigerating machine oil, more preferably 100 ppm or less, and further preferably 50 ppm or less. Especially, when a refrigerating machine oil is used in a closed refrigerating machine, a low moisture content is required from the viewpoints of the thermal and chemical stability of a refrigerating machine oil, or influence on electrical insulation.

The acid value of the refrigerating machine oil is preferably 0.1 mg KOH/g or less and more preferably 0.05 mg KOH/g or less. The hydroxyl value of the refrigerating machine oil is preferably 5.0 mg KOH/g or less and more preferably 2.0 mg KOH/g or less. When the acid value and hydroxyl value of the refrigerating machine oil satisfy the above conditions, corrosion of a metal used in the refrigerating machine or pipes can be prevented more reliably. The acid value as used herein means an acid value measured according to JIS K2501: 2003.

The ash content in the refrigerating machine oil is preferably 100 ppm or less and more preferably 50 ppm or less from the viewpoint of enhancing the thermal and chemical stability of the refrigerating machine oil to prevent formation of sludge or the like. The ash content as used herein means an ash measured according to JIS K2272: 1998.

The pour point of a refrigerating machine oil may be preferably −10° C. or less, more preferably −20° C. or less, and further preferably −30° C. or less. The pour point as used herein means a pour point measured according to JIS K2269:1987.

The refrigerating machine oil according to the present embodiment is used in combination with an unsaturated hydrofluorocarbon refrigerant. The working fluid composition for a refrigerating machine according to the present embodiment contains the refrigerating machine oil described thus far and an unsaturated hydrofluorocarbon refrigerant.

That is, a composition containing an ester of a polyhydric alcohol and a fatty acid and an ether compound of a polyhydric alcohol is favorably used for a constituent of a refrigerating machine oil to be used in combination with an unsaturated hydrofluorocarbon refrigerant or as a constituent of a working fluid composition for a refrigerating machine containing a refrigerating machine oil and an unsaturated hydrofluorocarbon refrigerant. A composition containing an ester of a polyhydric alcohol and a fatty acid and an ether compound of a polyhydric alcohol is favorably used for manufacturing a refrigerating machine oil to be used in combination with an unsaturated hydrofluorocarbon refrigerant or in production of a working fluid composition for a refrigerating machine containing a refrigerating machine oil and an unsaturated hydrofluorocarbon refrigerant.

Examples of an unsaturated hydrofluorocarbon refrigerant include 1,2,3,3,3-pentafluoropropene (HFO-1225ye), 1,3,3, 3-tetrafluoropropene (HFO-1234ze), 2,3,3,3-tetrafluoropropene (HFO-1234yf), 1,2,3,3-tetrafluoropropene (HFO-1234ye), and 3,3,3-trifluoropropene (HFO-1243 zf). These unsaturated hydrofluorocarbon refrigerants are used singly or as a mixture of two or more. Among these unsaturated hydrofluorocarbon refrigerants, 1,3,3,3-tetrafluoropropene (HFO-1234ze) and 2,3,3,3-tetrafluoropropene (HFO-1234yf) are preferred, and 2,3,3,3-tetrafluoropropene (HFO-1234yf) is more preferred, from the viewpoint of the stability of the refrigerating machine oil in a refrigerant atmosphere and from the viewpoint of reduction of GWP.

The refrigerant may consist only of an unsaturated hydrofluorocarbon refrigerant or may contain another refrigerant in addition to the unsaturated hydrofluorocarbon refrigerant. Examples of the other refrigerant include: saturated hydrofluorocarbon refrigerants; fluorine-containing ether refrigerants such as perfluoroethers; bis(trifluoromethyl)sulfide refrigerants; trifluoroiodomethane refrigerants; and natural refrigerants such as dimethyl ether, carbon dioxide, ammonia, and hydrocarbons.

Examples of a saturated hydrofluorocarbon refrigerant include difluoromethane (HFC-32), pentafluoroethane (HFC-125), 1,1,2,2-tetrafluoroethane (HFC-134), 1,1,1,2-tetrafluoroethane (HFC-134a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa), and 1,1,1,3,3-pentafluorobutane (HFC-365mfc). Among them difluoromethane (HFC-32), and 1,1,1,2-tetrafluoroethane (HFC-134a) are preferable from the viewpoints of the stability of a refrigerating machine oil in an atmosphere of a refrigerant and reduction of GWP.

The content of the unsaturated hydrofluorocarbon refrigerant may be preferably 25% by mass or more, more preferably 50% by mass or more, and further preferably 75% by mass or more based on the total amount of the refrigerants.

The content of a refrigerating machine oil in a working fluid composition for a refrigerating machine may be preferably 1 part by mass or more based on 100 parts by mass of a refrigerant, and more preferably 2 parts by mass or more; and may be preferably 500 parts by mass or less, and more preferably 400 parts by mass.

A refrigerating machine oil and a working fluid composition for a refrigerating machine are used advantageously in an air-conditioner, a refrigerator, or an open- or closed type car air-conditioner provided with a reciprocal or rotary closed type compressor. A refrigerating machine oil and a working fluid composition for a refrigerating machine are used advantageously in a cooling device, etc. such as a dehumidifier, a water heater, a freezer, a refrigerator/freezer storehouse, an automatic vending machine, a showcase, and a chemical plant. A refrigerating machine oil and a working fluid composition for a refrigerating machine are also used advantageously in a refrigerating machine provided with a centrifugal compressor.

EXAMPLES

The present invention will be described below more specifically based on Examples, provided that the present invention be not limited to the following Examples.

Base oils and additives used in Examples are listed below. Table 1 shows the constitution and kinematic viscosity of esters used as base oils.

[Base Oil]

TABLE 1

| Base oil No. | | A1 | A2 | A3 |
|---|---|---|---|---|
| Constitution of ester | Polyhydric alcohol | Pentaerythritol | Pentaerythritol | Dipentaerythritol |
| | Fatty acid A Type | 2-methylpropanoic acid | 2-ethylhexanoic acid | 2-ethylhexanoic acid |
| | Mixing ratio (% by mole) | 35 | 50 | 50 |
| | Fatty acid B Type | 3,5,5-trimethyl-hexanoic acid | 3,5,5-trimethyl-hexanoic acid | 3,5,5-trimethyl-hexanoic acid |
| | Mixing ratio (% by mole) | 65 | 50 | 50 |
| Kinematic viscosity | 40° C. (mm$^2$/s) | 69.4 | 68.4 | 222.5 |
| | 100° C. (mm$^2$/s) | 8.2 | 8.4 | 18.8 | a1: Copolymer of Ethyl Vinyl Ether and Isobutyl Vinyl Ether (Ethyl vinyl ether/isobutyl vinyl ether=9/1 (molar ratio), Number average molecular weight (Mn)=1200, Ratio (Mw/Mn) between weight average molecular weight (Mw) and number average molecular weight (Mn)=1.23, Kinematic viscosity at 40° C.=67.8 mm$^2$/s, Kinematic viscosity at 100° C.=8.20 mm$^2$/s, Viscosity index=86)

a2: Polypropylene Glycol Dimethyl Ether (Number average molecular weight (Mn)=1500, Ratio (Mw/Mn) between weight average molecular weight (Mw) and number average molecular weight (Mn)=1.10, Ratio of oxyethylene groups in total oxyalkylene groups=0% by mole, Kinematic viscosity at 40° C.=40.1 mm$^2$/s, Kinematic viscosity at 100° C.=9.25 mm$^2$/s, Viscosity index=224)

[Additives]
C1: Glycerin monooleyl ether
C2: Glycerin monostearyl ether
C3: Glycerin mono-2-ethylhexyl ether
D1: Glycidyl neodecanoate
D2: 2-ethylhexyl glycidyl ether
D3: 1,2-epoxyhexadecane
E1: 2,6-di-tert-butyl-p-cresol Refrigerating machine oils with compositions shown in Tables 2 to 4 were prepared using the base oils and additives listed above. The following antiwear property test and stability test were conducted on each refrigerating machine oil.

[Antiwear Property Test]

In the antiwear property test there was used a high-pressure atmosphere friction tester manufactured by SHINKO ENGINEERING CO., LTD. (rotational sliding system employing a rotating vane and a fixed disk) and capable of creating a refrigerant atmosphere analogous to that in an actual compressor. The test conditions were as follows: Oil volume=600 ml, Test temperature=100° C., Rotating speed=430 rpm, Applied load=65 kgf, Test time=1 hour, Pressure in test chamber=1.1 MPa. The vane used was SKH-51, and the disk used was FC250. The refrigerant used was 2,3,3,3-tetrafluoropropene (HFO-1234yf) or 1,1,1,2-tetrafluoroethane (R134a) as shown in Tables 2 and 3. The evaluation of antiwear property was made based on the wear depth of the vane, since the amount of wear of the disk was considerably small. A rating of "A" was given when the wear depth was less than 10 μm, a rating of "B" was given when the wear depth was 10 μm or more and less than 15 μm, and a rating of "C" was given when the wear depth was 15 μm or more. The results are shown in Tables 2 to 4.

[Stability Test]

A stability test was conducted according to JIS K2211: 2009 (Autoclave test). That is, 80 g of each refrigerating machine oil conditioned to a moisture content of 100 ppm was weighed into an autoclave, in which a catalyst (iron wire, copper wire, and aluminum wire, each having an outer diameter of 1.6 mm and a length of 50 mm), and 20 g of 2,3,3,3-tetrafluoropropene (HFO-1234yf) or 1,1,1,2-tetrafluoroethane (R134a) were placed and which was closed and then heated to 145° C. After 150 hours the visual appearance and acid value (HS C2101: 1999) of the refrigerating machine oil were examined. The results are shown in Tables 2 to 4.

TABLE 2

| | | Example 1 | Example 2 | Example 3 | Example 4 |
|---|---|---|---|---|---|
| Composition of base oil (% by mass, based on total amount of base oil) | A1 | — | 70 | — | — |
| | A2 | 70 | — | 90 | 90 |
| | A3 | 30 | 30 | 10 | 10 |
| | a1 | — | — | — | — |
| | a2 | — | — | — | — |
| Composition of refrigerating machine oil (% by mass, based on total amount of refrigerating machine oil) | Base oil | 99.7 | 99.0 | 98.5 | 98.8 |
| | C1 | 0.3 | 0.1 | — | — |
| | C2 | — | — | 0.1 | — |
| | C3 | — | — | — | 0.3 |
| | D1 | — | 0.5 | 1.0 | — |
| | D2 | — | — | — | 0.5 |
| | D3 | — | — | — | — |
| | E1 | — | 0.4 | 0.4 | 0.4 |
| Refrigerant | | HFO-1234yf | HFO-1234yf | HFO-1234yf | HFO-1234yf |
| Antiwear property test | Wear depth | A | A | A | A |
| Stability test | Visual appearance | No deposition | No deposition | No deposition | No deposition |
| | Acid value (mgKOH/g) | 0.01 | 0.01 | 0.01 | 0.01 |

TABLE 3

| | | Example 5 | Example 6 | Example 7 | Example 8 |
|---|---|---|---|---|---|
| Composition of base oil (% by mass, based on total amount of base oil) | A1 | — | — | — | — |
| | A2 | 70 | 70 | 60 | 60 |
| | A3 | 30 | 30 | 40 | 40 |
| | a1 | — | — | — | — |
| | a2 | — | — | — | — |
| Composition of refrigerating machine oil (% by mass, based on total amount of refrigerating machine oil) | Base oil | 99.0 | 98.8 | 99.0 | 98.3 |
| | C1 | 0.1 | 0.3 | 0.1 | — |
| | C2 | — | — | — | 0.3 |
| | C3 | — | — | — | — |
| | D1 | — | — | — | — |
| | D2 | 0.5 | 0.5 | 0.5 | — |
| | D3 | — | — | — | 1.0 |
| | E1 | 0.4 | 0.4 | 0.4 | 0.4 |
| Refrigerant | | HFO-1234yf | HFO-1234yf | HFO-1234yf | HFO-1234yf |
| Antiwear property test | Wear depth | A | A | A | A |
| Stability test | Stability test | No deposition | No deposition | No deposition | No deposition |
| | Acid value (mgKOH/g) | 0.01 | 0.01 | 0.01 | 0.01 |

TABLE 4

| | | Comp. Example 1 | Comp. Example 2 | Comp. Example 3 | Comp. Example 4 |
|---|---|---|---|---|---|
| Composition of base oil (% by mass, based on total amount of base oil) | A1 | — | — | — | — |
| | A2 | 70 | — | — | — |
| | A3 | 30 | — | — | — |
| | a1 | — | 100 | 100 | — |
| | a2 | — | — | — | 100 |

TABLE 4-continued

|  |  | Comp. Example 1 | Comp. Example 2 | Comp. Example 3 | Comp. Example 4 |
|---|---|---|---|---|---|
| Composition of refrigerating machine oil (% by mass, based on total amount of refrigerating machine oil) | Base oil | 100 | 99.7 | 99.2 | 98.3 |
|  | C1 | — | 0.3 | 0.1 | — |
|  | C2 | — | — | — | 0.3 |
|  | C3 | — | — | — | — |
|  | D1 | — | — | — | — |
|  | D2 | — | — | 0.3 | — |
|  | D3 | — | — | — | 1.0 |
|  | E1 | — | — | 0.4 | 0.4 |
| Refrigerant |  | HFO-1234yf | HFO-1234yf | HFO-1234yf | HFO-1234yf |
| Antiwear property test | Wear depth | C | C | C | C |
| Stability test | Stability test | No deposition | No deposition | No deposition | No deposition |
|  | Acid value (mgKOH/g) | 0.01 | 0.05 | 0.10 | 0.15 |

TABLE 5

|  |  | Reference 1 | Reference 2 | Reference 3 | Reference 4 | Reference 5 |
|---|---|---|---|---|---|---|
| Composition of base oil (% by mass, based on total amount of base oil) | A1 | 70 | — | — | — | — |
|  | A2 | — | 70 | 60 | — | — |
|  | A3 | 30 | 30 | 40 | — | — |
|  | a1 | — | — | — | 100 | — |
|  | a2 | — | — | — | — | 100 |
| Composition of refrigerating machine oil (% by mass, based on total amount of refrigerating machine oil) | Base oil | 99.0 | 99.0 | 98.3 | 99.2 | 98.3 |
|  | C1 | 0.1 | 0.1 | — | 0.1 | — |
|  | C2 | — | — | 0.3 | — | 0.3 |
|  | C3 | — | — | — | — | — |
|  | D1 | 0.5 | — | — | — | — |
|  | D2 | — | 0.5 | — | 0.3 | — |
|  | D3 | — | — | 1.0 | — | 1.0 |
|  | E1 | 0.4 | 0.4 | 0.4 | 0.4 | 0.4 |
| Refrigerant |  | R134a | R134a | R134a | R134a | R134a |
| Antiwear property test | Wear depth | B | B | B | B | B |
| Stability test | Stability test | No deposition | No deposition | No deposition | No deposition | No deposition |
|  | Acid value (mgKOH/g) | 0.01 | 0.01 | 0.01 | 0.01 | 0.01 |

The invention claimed is:

1. A working fluid composition for a refrigerating machine comprising:
    a refrigerating machine oil; and
    an unsaturated hydrofluorocarbon refrigerant,
    wherein the refrigerating machine oil comprises:
        an ester of a polyhydric alcohol and a fatty acid as a base oil; and
        an ether compound of a polyhydric alcohol having 3 to 6 hydroxy groups.

2. The working fluid composition for a refrigerating machine according to claim 1, wherein the unsaturated hydrofluorocarbon is at least one selected from 1,3,3,3-tetrafluoropropene and 2,3,3,3-tetrafluoropropene.

3. The working fluid composition for a refrigerating machine according to claim 1, wherein the ether compound is a compound represented by the following formula (1):

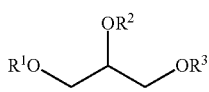

(1)

wherein $R^1$, $R^2$, and $R^3$ each independently represent a hydrogen atom, a C1 to C22 alkyl group, an alkenyl group, or an aryl group, and wherein at least one of $R^1$, $R^2$, and $R^3$ represents the group other than a hydrogen atom.

4. The working fluid composition for a refrigerating machine according to claim 1, wherein a content of the ether compound is 0.4% by mass or less based on a total amount of the refrigerating machine oil.

5. The working fluid composition for a refrigerating machine according to claim 1, wherein the ether compound is a monoether compound.

* * * * *